UNITED STATES PATENT OFFICE.

WILLIAM R. CHIPMAN, OF NEW YORK, N. Y., ASSIGNOR OF ONE-HALF TO MAX BLUMENTHAL, OF NEW YORK, N. Y., AND FREDERICK G. KUNE, OF BROOKLYN, NEW YORK.

ELECTRODE FOR PURIFYING LIQUIDS BY ELECTROLYSIS.

SPECIFICATION forming part of Letters Patent No. 694,933, dated March 4, 1902.

Application filed April 29, 1901. Serial No. 58,052. (No model.)

*To all whom it may concern:*

Be it known that I, WILLIAM R. CHIPMAN, a citizen of the United States, and a resident of New York city, in the county of New York and State of New York, have invented a certain new and useful Improvement in Electrodes for Purifying Liquids by Electrolysis, of which the following is a specification.

This invention relates to an improvement in means for purifying liquids by the electrolytic process, and has for its specific object the formation of an electrode by which a thorough and complete purification of liquids may be effected. This electrode consists of a composition of certain metals which when the electrode is in use develop oxyhydrates, certain other metals for binding the composition together, and certain metals for making the composition sufficiently hard to be durable.

The invention therefore consists of an electrode for the purpose specified compounded and constructed substantially as hereinafter specified and claimed.

I have found by experiment that the following metals—namely, metallic magnesium, lithium, barium, strontium, and aluminium—serve well the purpose of developing oxyhydrates, that cadmium, straits tin, bismuth, and cobalt serve well for binding metals, and that nickel, ferrosilicon, chromium, ferromanganese, and platinum serve well in the composition for hardening metals.

A satisfactory electrode for my purpose may be made by combining any two or more of the first group with any one or more of the second group and with the above any one or more of the third group, a suitable flux being used in effecting the combination. From the compound the electrode may be cast or rolled, as desired, and made into any desired form or shape.

Different liquids can best be purified by means of electrodes composed of specifically different compounds of the above ingredients; but I have determined upon a compound thereof that works admirably with all liquids on which it has yet been tried, and particularly in the purification of water, toward which this invention is chiefly directed. The compound is as follows, namely: magnesium, twenty parts; aluminium, forty parts; straits tin, fifteen parts; cadmium, ten parts; nickel, five parts, and ferrosilicon, ten parts, together with any suitable flux, as resin or borax. I do not, however, limit myself to the exact proportions named nor to all of the ingredients.

I effect the compounding of the above ingredients best by first reducing the aluminium by heat to a molten condition, then adding the magnesium in small portions, the flux being added meanwhile to keep the mass fluid, then adding the more refractory metals—the nickel and ferrosilicon—and when ready to pour into the molds the tin and cadmium, the compound being then covered with fine charcoal to prevent oxidation.

The electrode described is used as the anode, while any suitable material may be used as the cathode—such as zinc, aluminium, carbon, or iron—an external current being employed, as is the usual practice in purifying liquids by electrolytic action.

The invention claimed is—

1. An electrode for use in the purification of liquids by the electrolytic process consisting of a compound of metallic magnesium and aluminium from which oxyhydrates may be developed by electrolysis, one or more metals serving as a binder and one or more metals serving for hardening the compound, together with a suitable flux.

2. An electrode for use in the purification of liquids by the electrolytic process consisting of a compound of metallic magnesium, aluminium, straits tin, cadmium, nickel, ferrosilicon and a suitable flux.

3. An electrode for use in the purification of liquids by the electrolytic process consisting of a compound of metallic magnesium twenty parts, aluminium forty parts, straits tin fifteen parts, cadmium ten parts, nickel five parts, ferrosilicon ten parts and a suitable flux.

Signed at New York, in the county of New York and State of New York, this 27th day of April, A. D. 1901.

WILLIAM R. CHIPMAN.

Witnesses:
DELBERT H. DECKER,
E. L. LAWLER.